United States Patent
Jeon et al.

(10) Patent No.: US 7,459,240 B2
(45) Date of Patent: Dec. 2, 2008

(54) NONAQUEOUS ELECTROLYTE FOR BATTERY

(75) Inventors: Jong Ho Jeon, Gyeonggi-do (KR); Hak Soo Kim, Daegu (KR); Jong Seob Kim, Daejeon (KR)

(73) Assignee: Cheil Industries, Inc. (KR)

( * ) Notice: Subject to any disclaimer, the term of this patent is extended or adjusted under 35 U.S.C. 154(b) by 0 days.

(21) Appl. No.: 10/583,426

(22) PCT Filed: Oct. 27, 2004

(86) PCT No.: PCT/KR2004/002726

§ 371 (c)(1),
(2), (4) Date: Apr. 2, 2007

(87) PCT Pub. No.: WO2005/064736

PCT Pub. Date: Jul. 14, 2005

(65) Prior Publication Data

US 2008/0032201 A1    Feb. 7, 2008

(30) Foreign Application Priority Data

Dec. 30, 2003  (KR)  .................. 10-2003-0100351

(51) Int. Cl.
*H01M 10/40* (2006.01)
(52) U.S. Cl. ...................... 429/326; 429/200
(58) Field of Classification Search .............. 429/200, 429/324, 326
See application file for complete search history.

(56) References Cited

U.S. PATENT DOCUMENTS 5,561,005 A    10/1996    Omaru et al.

(Continued)

FOREIGN PATENT DOCUMENTS

JP    09-050822    2/1997

*Primary Examiner*—Stephen J. Kalafut
(74) *Attorney, Agent, or Firm*—Myers Bigel Sibley & Sajovec

(57) ABSTRACT

A nonaqueous electrolyte for a battery having explosion inhibiting properties includes an organic solvent and a lithium salt. A benzene-substituted phosphate derivative is provided at a level in a range from about 0.1% to about 10% by weight. The benzene-substituted phosphate derivative can be expressed by the following formula:

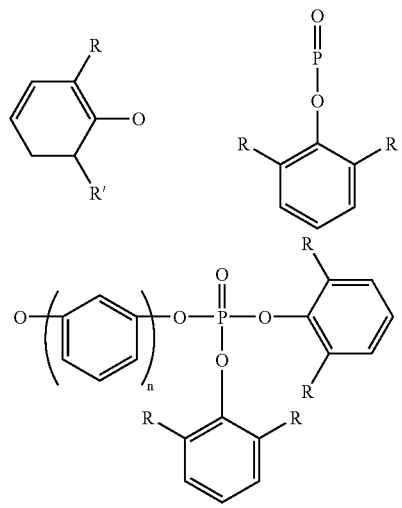

wherein R represents a halogen-substituted C1-C8 alkyl or allyl compound or an unsubstituted C1-C8 alkyl or allyl compound, and n is an integer between 1 and 3.

4 Claims, 4 Drawing Sheets

U.S. PATENT DOCUMENTS

| | | | |
|---|---|---|---|
| 5,580,684 A * | 12/1996 | Yokoyama et al. | 429/324 |
| 6,919,141 B2 * | 7/2005 | Gan et al. | 429/326 X |
| 6,921,612 B2 * | 7/2005 | Choy et al. | 429/326 |
| 2002/0192565 A1 | 12/2002 | Ueda et al. | |
| 2004/0142246 A1 * | 7/2004 | Han et al. | 429/324 |

* cited by examiner

[Fig. 1]
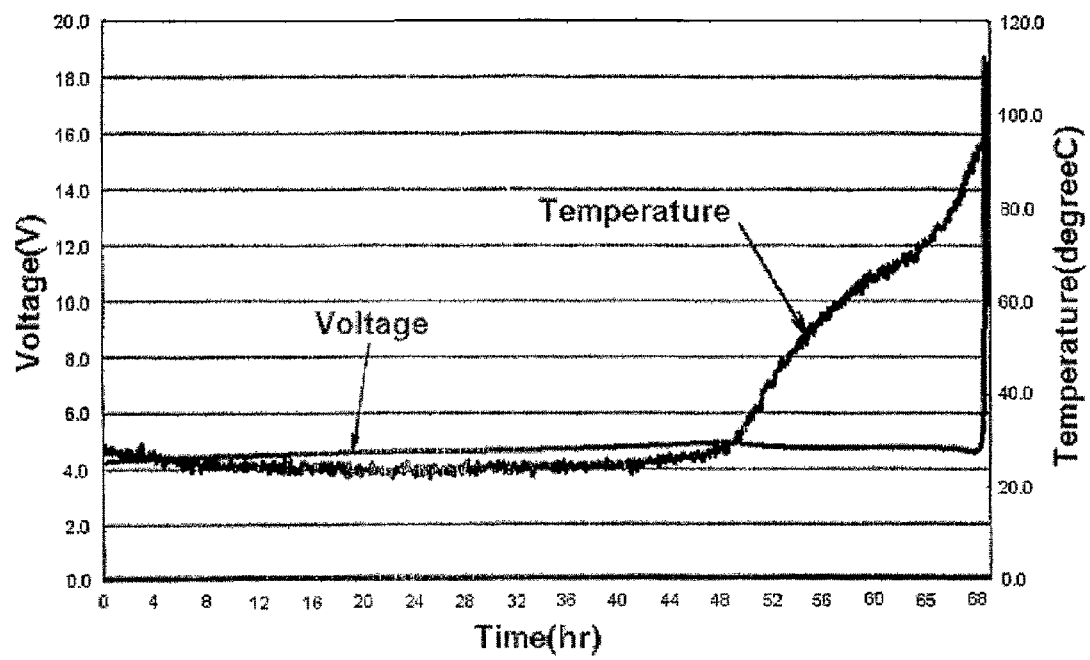

[Fig. 2]
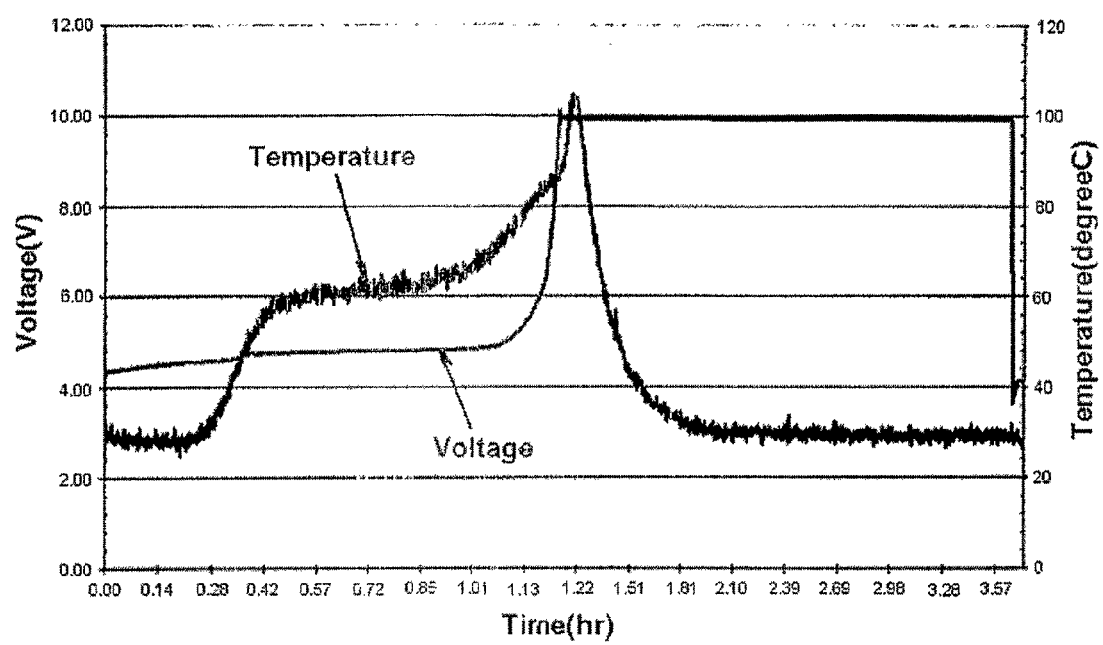

【Fig. 3】
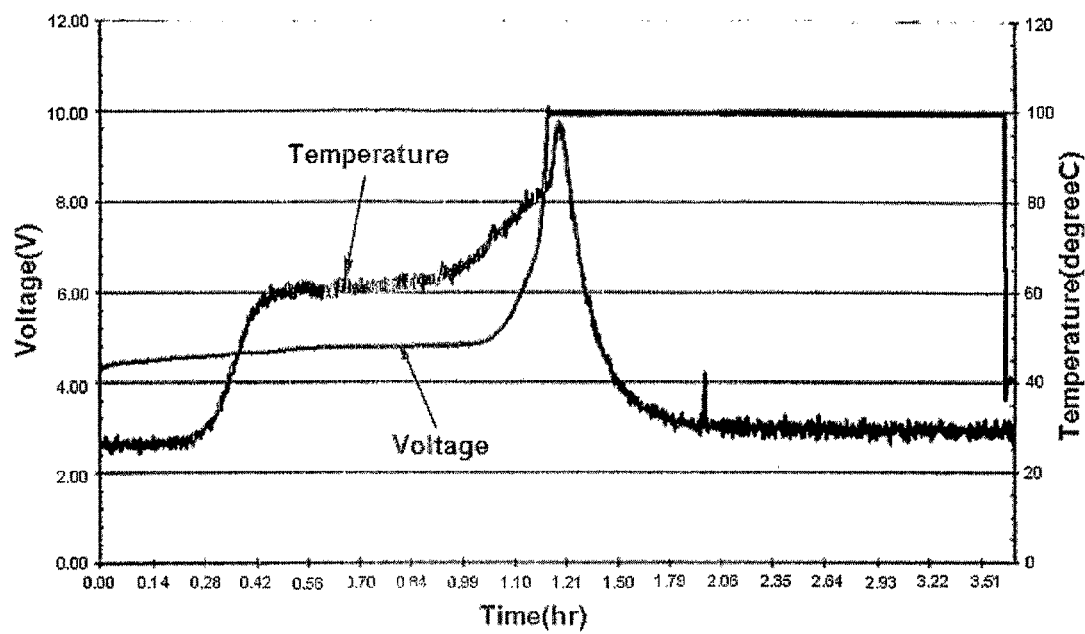

[Fig. 4]
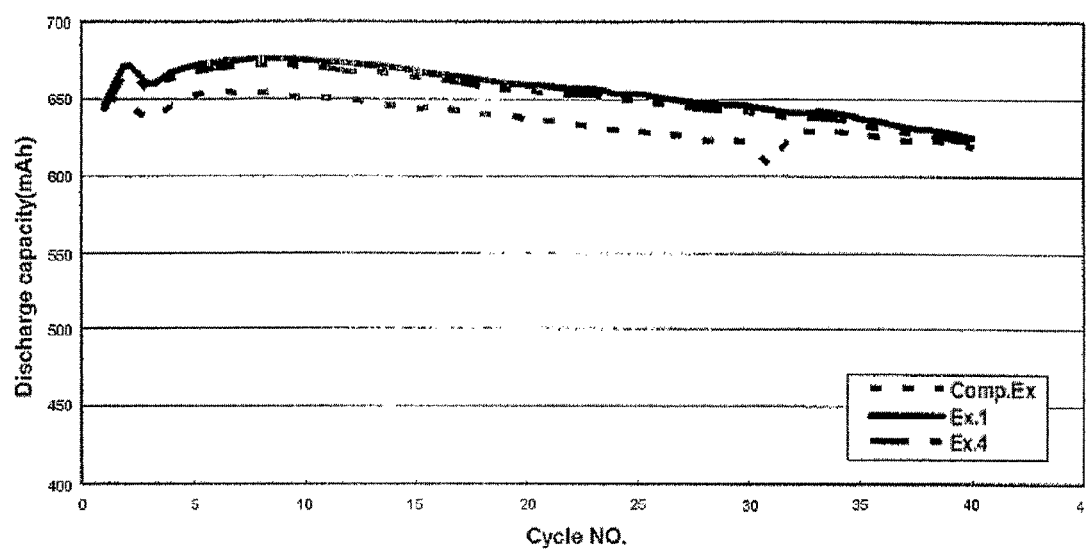

NONAQUEOUS ELECTROLYTE FOR BATTERY

TECHNICAL FIELD

The present invention relates to a nonaqueous electrolyte for a battery, and more particularly to a nonaqueous electrolyte for a lithium battery composed of an organic solvent and a lithium salt and having an excellent stability upon overcharging thereof, wherein a benzene-substituted phosphate derivative is included.

BACKGROUND ART

A lithium secondary battery has advantages such as high energy density, low self-discharge rate and low-weight, and thus receives a great deal of attention as a high performance energy source for portable electronic instruments requiring slimness and low-weight such as a notebook computer, a camcorder, a mobile phone, and the like. This lithium secondary battery generally uses mixed oxides of lithium metal as its cathode active material, and carbon material or metallic lithium as its anode material, respectively. The lithium battery is typically designed with a high pressure, and thus an organic solvent capable of withstanding a high voltage, that is, a nonaqueous electrolyte, is employed as the electrolyte. In this connection, the nonaqueous electrolyte in which lithium salts are dissolved in an organic solvent is primarily used.

The electrolyte for the lithium battery is required to be stable against a lithium anode, but it is said that there is no solvent showing a thermodynamic stability to lithium. In practice, there has been considered that the electrolyte is decomposed relative to the anode upon initial charging and resulting products form an ionic conductivity protection film, i.e., SEI (Solid Electrode Interface) on a surface of lithium and then inhibits a reaction between the electrode and electrolyte thereby stabilizing the battery.

However, in case of such a nonaqueous electrolyte based secondary battery, if a power circuit or a charger of electronic instruments is out of order or overcharged, aberrant heat generation occurs in the battery and further, in extreme case, damage or catching fire of the battery may occur. As such, it is an important problem to effectively inhibit such heat generation and secure stability of the battery so as to prevent thermal runaway, upon abnormal operation such as overcharging the battery.

As a measure to prevent rupture and catching fire of the battery upon overcharging thereof, there has been to control primarily a charging voltage of the battery by a charger. However, at the present time, since use of a protection circuit, a protection device, and the like, significantly limits miniaturization and reduced production costs of a battery pack, there is an urgent need for a method capable of securing stability of the battery without the protection circuit or protection device. In addition, there have been proposed cutting off electric current by gas production when overcurrent is generated in the battery, or cutting off overcharge current by fusion of a separator, but a satisfactory protection mechanism to prevent overcharge has yet to be realized.

In order to overcome these problems, Japanese Patent Publication Nos. Hei 7-302614, 9-50822 and 9-106835, and Japanese Patent No. 2939469 have proposed methods to ensure stability against overcharging of the battery by adding a small amount of an aromatic compound to the electrolyte of the lithium secondary battery.

More specifically, Japanese Patent Publication Nos. Hei 7-302614 and 9-50822 propose the use of a lower molecular weight organic compound with a molecular weight of less than 500, such as anisole, having a reversible redox potential at above a cathode potential upon full charging of the secondary battery, and a $\pi$ electron orbit, in the electrolyte as an additive. Such a lower molecular weight organic compound serves as a redox shuttle and consumes overcharge current between the cathode and anode to establish a protection mechanism.

DISCLOSURE OF INVENTION

Technical Problem

Meanwhile, Japanese Patent Publication No. Hei 9-106835 suggests a method for protecting the battery upon overcharging thereof using aromatic compounds such as biphenyl, 3-chlorothiophene and furane which initiate a polymerization reaction at voltage when overcharged and therefore increase internal resistance of the battery.

However, anisole proposed in Japanese Patent Publication Nos. Hei 7-302614 and 9-50822 clearly functions as the redox shuttle upon overcharging, while it also participates in a reaction within a general range of the battery voltage thereby adversely affecting cycle characteristics of discharge capacity of the battery.

Technical Solution

Therefore, the present invention has been made in view of the above problems, and it is an object of the present invention to provide a nonaqueous electrolyte for a battery capable of inhibiting explosion/catching fire that may occur if the battery is overcharged.

The present invention provides a nonaqueous electrolyte for a battery capable of effectively inhibiting heat generation so as to prevent thermal runaway without affecting characteristics of the battery, and ensuring reliability and stability of the battery.

The present invention provides a nonaqueous electrolyte for a battery capable of realizing miniaturization and reduced production costs of a battery pack by preventing thermal runaway due to overcharging of the battery without a separate protection circuit or protection device.

In accordance with an aspect of the present invention, the provision of a nonaqueous electrolyte for a lithium battery composed of an organic solvent and a lithium salt, comprising 0.1 to 10% by weight of a benzene-substituted phosphate derivative.

Advantageous Effects

The nonaqueous electrolyte for a battery in accordance with the present invention can be used to prepare a lithium battery by a conventional method. The lithium battery thus prepared has electrochemical stability higher than that of a battery using a conventional nonaqueous electrolyte and thus exhibits excellent stability when the battery is overcharged.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing overcharging results of a battery to which a nonaqueous electrolyte of the Comparative Example is applied;

FIGS. 2 and 3 are graphs showing overcharging results of a battery to which a nonaqueous electrolyte in accordance with the present invention is applied; and FIG. 4 is a graph comparing the performance of a charging/discharging service life between a battery to which a nonaqueous electrolyte in accordance with the present invention is applied and a battery to which a nonaqueous electrolyte of a Comparative Example is applied.

BEST MODE FOR CARRYING OUT THE INVENTION

Now, the present invention will be described in more detail.

The present invention provides a nonaqueous electrolyte for a lithium battery composed of an organic solvent and a lithium salt, comprising 0.1 to 10% by weight of a benzene-substituted phosphate derivative having the following formula (I):

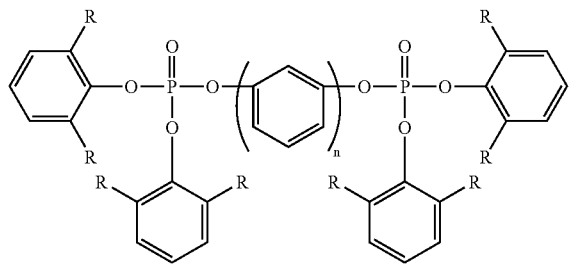

wherein R represents a halogen-substituted C1-C8 alkyl or allyl compound or an unsubstituted C1-C8 alkyl or allyl compound, and n is an integer between 1 and 3.

Addition amount of the benzene-substituted phosphate derivative in the present invention is within a range of 0.1 to 10% by weight, and preferably 1 to 5% by weight of the nonaqueous electrolyte. If the amount of the benzene-substituted phosphate derivative of the present invention added is less than 0.1% by weight, the desired stability effect upon overcharging the battery, intended in the present invention is not sufficiently obtained. On the contrary, even when addition amount of the benzene-substituted phosphate derivative exceeds 10% by weight, stability of the battery does not increase in proportion to the amount thereof used. Therefore, addition amount of the benzene-substituted phosphate derivative in the present invention is preferably within the above-mentioned range.

As cathode active material for a conventional lithium secondary battery, layered lithium cobalt oxide ($LiCoO_2$), lithium nickel oxide ($LiNiO_2$) or lithium manganese oxide ($LiMn_2O_4$), which has a large capacity per weight, is generally employed, but when overcharged, most of the lithium ions of these compounds are in released state, thus becoming significantly unstable, and they react with the electrolyte to cause acute decomposition and exothermic reaction or deposit lithium on the anode, which in turn may rupture or set fire the battery, in the worst case. The present invention intends to resolve a problem associated with stability occurring upon overcharging the battery by adding the benzene-substituted phosphate derivative to the nonaqueous electrolyte.

As examples of organic solvents of the nonaqueous electrolyte which may be used in the present invention, mention may be made of cyclic carbonates such as ethylene carbonate, propylene carbonate and γ-butyrolactone, linear carbonates such as dimethyl carbonate, diethyl carbonate, dipropyl carbonate, methylpropyl carbonate, ethylmethyl carbonate and ethylpropyl carbonate, propyl acetate, methyl acetate, ethyl acetate, butyl acetate, methyl propionate, and ethyl propionate. Preferably, in the present invention, a mixture of two or more of cyclic carbonate based organic solvent (for example, ethylene carbonate and propylene carbonate) and linear carbonate based organic solvent (for example, dimethyl carbonate, diethyl carbonate, ethylmethyl carbonate and methylpropyl carbonate) may be used as an organic solvent. An example of the preferred organic solvent is a mixture of ethylene carbonate and dimethyl carbonate.

In addition to those, at least one selected from the group consisting of propyl acetate, methyl acetate, ethyl acetate, butyl acetate, methyl propionate and ethyl propionate may be additionally mixed and used, if desired. The mixing ratio of the respective organic solvents selected from each group is not particularly limited as long as it does not interfere with the purpose of the present invention, and follows the mixing ratio used in preparing a conventional nonaqueous electrolyte for a lithium battery.

As lithium salt contained in the nonaqueous electrolyte in accordance with the present invention, at least one selected from the group consisting of $LiPF_6$, $LiClO_4$, $LiAsF_6$, $LiBF_4$ and $LiN(C_2F_5SO_3)_2$, $LiN(C_2F_5SO_2)_2$ and $LiN(CF_3SO_2)_2$ is preferably used. More preferably, $LiPF_6$ may be used. Preferably, concentration of the lithium salt in the present invention ranges from 0.8 to 2 M. Where the concentration of the lithium salt added is less than 0.8 M, conductivity of the electrolyte may be lowered leading to deterioration of performances thereof. Where it exceeds 2 M, a viscosity of the electrolyte increases at a low temperature and thus performance thereof at a low temperature may be lowered.

The nonaqueous electrolyte for a battery in accordance with the present invention can be used to prepare a lithium battery by a conventional method. The lithium battery thus prepared has electrochemical stability higher than that of a battery using a conventional nonaqueous electrolyte and thus exhibits excellent stability when the battery is overcharged.

Mode for the Invention

Now, the present invention will be described in more detail with reference to the following Examples. These examples are provided only for illustrating the present invention and should not be construed as limiting the scope and spirit of the present invention.

EXAMPLES

Example 1

Ethylene carbonate (EC), ethylmethyl carbonate (EMC) and diethyl carbonate (DEC) were mixed in a ratio of 1:1:1 and 1M of $LiPF_6$ as solute was dissolved therein to prepare a basic electrolyte. To the basic electrolyte thus obtained was added 1% by weight of a benzene-substituted phosphate derivative (n=1, R=$CH_3$) to obtain a final nonaqueous electrolyte. The nonaqueous electrolyte for a battery was used to prepare a square type battery 423048, using graphite as the active material of the anode and polyvinylidene fluoride (PVDF) as the binding agent. $LiCoO_2$ was used as the active material of the cathode and PVDF was used as the binding agent. As the conductive agent, acetylene black was used. The resistance of the battery, thus prepared, to 1.0C-rate 10V overcharging was tested and the results obtained are shown in Table 1.

Example 2

A battery was prepared following the same procedure as in Example 1, except that 3% by weight of a benzene-substituted phosphate derivative (n=1, R=CH$_3$) was added to the basic electrolyte in which ethylene carbonate (EC), ethylmethyl carbonate (EMC) and diethyl carbonate (DEC) were mixed in a ratio of 1:1:1 and 1M of LiPF$_6$ as solute was dissolved therein. The resistance of the battery, thus prepared, to overcharging was tested and the results obtained are shown in Table 1.

Example 3

A battery was prepared following the same procedure as in Example 1, except that 5% by weight of a benzene-substituted phosphate derivative (n=1, R=CH$_3$) was added to the basic electrolyte in which ethylene carbonate (EC), ethylmethyl carbonate (EMC) and diethyl carbonate (DEC) were mixed in a ratio of 1:1:1 and 1M of LiPF$_6$ as solute was dissolved therein. The resistance of the battery, thus prepared, to overcharging was tested and the results obtained are shown in Table 1.

Example 4

A battery was prepared following the same procedure as in Example 1, except that 1% by weight of a benzene-substituted phosphate derivative (n=2, R=CH$_3$) was added to the basic electrolyte in which ethylene carbonate (EC), ethylmethyl carbonate (EMC) and diethyl carbonate (DEC) were mixed in a ratio of 1:1:1 and 1M of LiPF$_6$ as solute was dissolved therein. The resistance of the battery, thus prepared, to overcharging was tested and the results obtained are shown in Table 1.

Example 5

A battery was prepared following the same procedure as in Example 1, except that 3% by weight of a benzene-substituted phosphate derivative (n=2, R=CH$_3$) was added to the basic electrolyte in which ethylene carbonate (EC), ethylmethyl carbonate (EMC) and diethyl carbonate (DEC) were mixed in a ratio of 1:1:1 and 1M of LiPF$_6$ as solute was dissolved therein. The resistance of the battery, thus prepared, to overcharging was tested and the results obtained are shown in Table 1.

Example 6

A battery was prepared following the same procedure as in Example 1, except that 5% by weight of a benzene-substituted phosphate derivative (n=2, R=CH$_3$) was added to the basic electrolyte in which ethylene carbonate (EC), ethylmethyl carbonate (EMC) and diethyl carbonate (DEC) were mixed in a ratio of 1:1:1 and 1M of LiPF$_6$ as solute was dissolved therein. The resistance of the battery, thus prepared, to overcharging was tested and the results obtained are shown in Table 1.

Comparative Example

A battery was prepared using the basic electrolyte in which ethylene carbonate (EC), ethylmethyl carbonate (EMC) and diethyl carbonate (DEC) were mixed in a ratio of 1:1:1 and 1M of LiPF$_6$ as solute was dissolved therein, but no benzene-substituted phosphate derivative was added. The characteristics of the battery thus prepared were evaluated and the results obtained are shown in Table 1.

TABLE 1

| | Formation charging (mAh) | Formation discharging (mAh) | Formation efficiency (%) | 1 C-rate overcharging |
|---|---|---|---|---|
| Ex. 1 | 723.8 | 646.4 | 89.3 | Normal |
| Ex. 2 | 720.9 | 640.2 | 88.8 | Normal |
| Ex. 3 | 716.5 | 629.8 | 87.9 | Normal |
| Ex. 4 | 722.8 | 646.9 | 89.5 | Normal |
| Ex. 5 | 721.1 | 642.5 | 89.1 | Normal |
| Ex. 6 | 720.3 | 636.0 | 88.3 | Normal |
| Comp. Ex. | 725.1 | 651.1 | 89.8 | xplosion/Catching fire |

Results of overcharging of the battery in Examples and Comparative Example

Method for Evaluating Battery Performances

Formation charging/discharging: In the charging/discharging test of the initial battery, a capacity obtained when the battery was charged up to 4.2 V at a constant current/constant voltage of 0.2C-rate was taken as a formation charging capacity, and a capacity obtained when the battery was discharged up to 3 V at constant current of 0.2C-rate was taken as a formation discharging capacity.

1C-rate 10 V overcharging: A fully-charged state battery was charged up to 10 V at constant current of 1C-rate and after reaching 10 V, then charged at constant voltage for 2 hours and 30 min. If battery does not explode or catch fire during the overcharging test, it can be considered to be effective at preventing overcharging of the battery.

FIG. 1 shows a graph of overcharge characteristics of the battery to which a nonaqueous electrolyte for the battery of the Comparative Example was applied, while FIGS. 2 and 3, respectively, show graphs comparing overcharge characteristics of the batteries to which each of the nonaqueous electrolytes of Examples 1 and 4 was applied. The batteries (Examples 2 and 3) to which nonaqueous electrolytes in accordance with the present invention were applied, exhibited an excellent stability as compared to the battery to which a nonaqueous electrolyte of the Comparative Example (FIG. 1) was applied, when the battery was overcharged. FIG. 4 shows a graph of comparison results for charge/discharge cycle performances between the battery to which the nonaqueous electrolyte in accordance with the present invention was applied and the battery to which a nonaqueous electrolyte of the Comparative Example was applied. As can be seen, the battery to which the nonaqueous electrolyte in accordance with the present invention was applied, exhibited excellent service life characteristics compared to the battery to which a nonaqueous electrolyte of the Comparative Example was applied.

INDUSTRIAL APPLICABILITY

The battery to which the nonaqueous electrolyte in accordance with the present invention was applied, has advantages such as excellent reliability and stability of the battery because of no catching fire or explosion due to thermal runaway resulting from overcharging the battery, and nonaqueous electrolyte in accordance with the present invention can realize a battery having a small size, light-weight, long service life, lower production costs and high energy density.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A nonaqueous electrolyte for a lithium battery composed of an organic solvent and a lithium salt, comprising 0.1 to 10% by weight of a benzene-substituted phosphate derivative having the following formula (I):

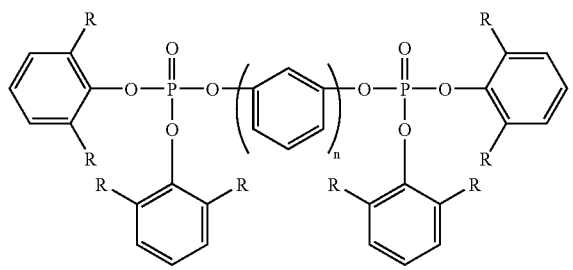

wherein R represents a halogen-substituted C1-C8 alkyl or allyl compound or an unsubstituted C1-C8 alkyl or allyl compound, and n is 1, 2 or 3.

2. The nonaqueous electrolyte as set forth in claim 1, wherein the solvent of the nonaqueous electrolyte comprises at least one organic solvent selected from the group consisting of ethylene carbonate (EC), propylene carbonate (PC), dimethyl carbonate (DMC), diethyl carbonate ethylmethyl carbonate (EMC) and fluorobenzene (FB).

3. The nonaqueous electrolyte as set forth in claim 1, wherein the lithium salt is at least one selected from the group consisting of $LiPF_6$, $LiBF_4$, $LiClO_4$, $LiN(C_2F_5SO_3)_2$, $LiN(C_2F_5SO_2)_2$ and $LiN(CF_3SO_2)_2$, and the concentration of the lithium salt in the electrolyte ranges from 0.8 to 2 M.

4. A battery comprising an anode, a cathode and an electrolyte, wherein the electrolyte comprises the nonaqueous electrolyte as set forth in claim 1.

* * * * *

UNITED STATES PATENT AND TRADEMARK OFFICE
CERTIFICATE OF CORRECTION

PATENT NO. : 7,459,240 B2 Page 1 of 1
APPLICATION NO. : 10/583426
DATED : December 2, 2008
INVENTOR(S) : Jeon et al.

It is certified that error appears in the above-identified patent and that said Letters Patent is hereby corrected as shown below:

Column 1, Line 3: Please insert after the title:
-- Cross-Reference to Related Application
The present application is a U.S. national phase application of PCT International Application No. PCT/KR2004/002726, having an international filing date of October 27, 2004 and claiming priority to Korean Application No. 10-2003-0100351 filed December 30, 2003. The above PCT International Application was published in the English language and has International Publication No. WO 2005/064736. --

Signed and Sealed this

Twenty-fourth Day of February, 2009

JOHN DOLL
*Acting Director of the United States Patent and Trademark Office*